No. 878,052. PATENTED FEB. 4, 1908.
J. A. ELLIOTT.
PUMP.
APPLICATION FILED DEC. 17, 1906.

Witnesses
Inventor
J. A. Elliott.
by H. B. Willson & Co.
Attorneys

UNITED STATES PATENT OFFICE.

JOHN A. ELLIOTT, OF BUTTE, MONTANA.

PUMP.

No. 878,052.  Specification of Letters Patent.  Patented Feb. 4, 1908.

Application filed December 17, 1906. Serial No. 348,273.

*To all whom it may concern:*

Be it known that I, JOHN A. ELLIOTT, a citizen of the United States, residing at Butte, in the county of Silverbow and State of Montana, have invented certain new and useful Improvements in Pumps; and I do declare the following to be a full, clear, and exact description of the invention, such as will enable others skilled in the art to which it appertains to make and use the same.

This invention relates to improvements in pumps.

The object of the invention is to provide a pump adapted for pumping air or water or both, which will be simple, strong and durable in construction, efficient in operation, and have a perfect delivery and a greatly increased capacity over pumps of similar character, as heretofore constructed.

With the foregoing and other objects in view, the invention consists in the construction, combination, and arrangement of devices, hereinafter described and claimed.

Figure 1:
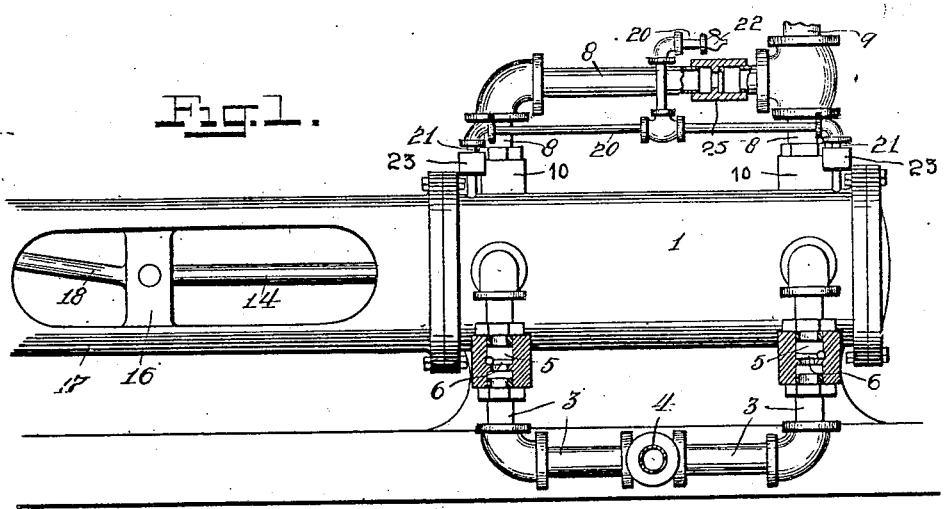
Figure 2:
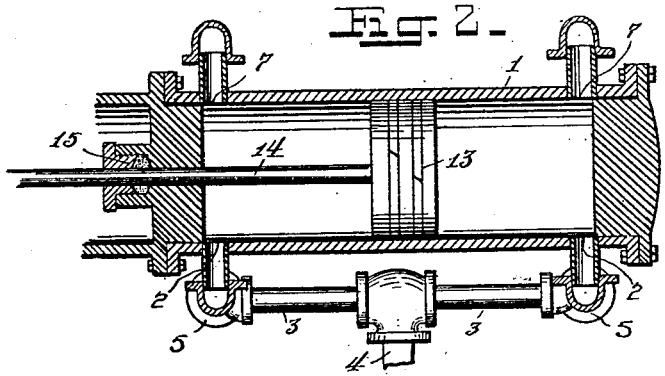
Figure 3:
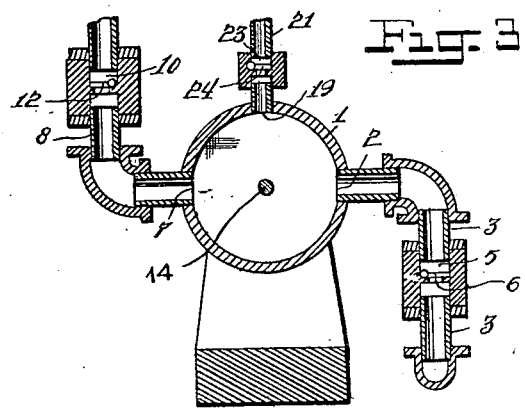

In the accompanying drawings,— Figure 1 is a side view of a pump constructed in accordance with the invention; Fig. 2 is a horizontal sectional view of the same; and Fig. 3 is a vertical cross-sectional view, taken on a line with the valve at one end of and through the cylinder.

Referring more particularly to the drawings, 1 denotes the pump cylinder, which may be of any suitable size and construction. In one side of the cylinder 1 near the opposite ends thereof are formed inlet or suction ports 2, which are connected by branch pipes 3, to the main inlet or supply pipe 4. In the branch pipes 3 are arranged valve chambers 5, in which are mounted inlet valves 6.

In the opposite side of the cylinder, adjacent to each end thereof, are formed discharge ports 7, which are connected by branch pipes 8 to a main or common discharge pipe 9. In the branch pipes 8 are arranged valve chambers 10, in which are mounted discharge or exhaust valves 12.

Slidably mounted in the cylinder 1 is a piston 13, having a piston rod 14, which is adapted to work through a stuffing-box 15, arranged in one end of the cylinder, as shown. The outer end of the piston rod 14 is secured to a cross-head 16, which is slidably mounted in a guide frame 17 secured to the end of the cylinder. To the outer end of the piston rod is secured a pitman or connecting rod 18, the opposite end of which is adapted to be connected with the driving mechanism of an engine, (not shown).

In the side of the cylinder 1, at right angles to the inlet and discharge ports are formed relief ports 19, said ports being arranged adjacent to each end of the cylinder and are connected to a main relief pipe 20 by branch pipes 21. To the outer end of the pipe 20 is connected a petcock 22 or other suitable cut-off valve for positively controlling opening and closing of the main relief pipe. In the branch pipes 21 are arranged valve chambers 23, in which are mounted relief valves 24. By providing the cylinder 1 with the relief ports and valves, as shown and described, the necessity for air chambers is dispensed with, thereby increasing the capacity of the pump, which having no air chamber will not become clogged with dead water or accumulated air, which becoming compressed interferes with the proper working of the valves, these and other troubles common to the usual forms of pumps being entirely obviated by the use of relief ports and valves, as shown and described. By providing the pet cock 22 on the end of the relief pipe, the cylinder may be kept free from any compression of air or accumulation of dead water and under full control of the engineer from any desired point, thus enabling the pump to be continually worked at its full capacity and providing for a perfect delivery of the water.

By reversing the relief valve 24 and removing the pet-cock from the end of the relief pipe, and placing a check valve 25 in the discharge pipe 8 between the exhaust valves 12, the device may be converted into a perfect air pump. By reversing one of the relief valves 24, and connecting the pet-cock with the other relief valve and disconnecting one of the suction valves 6, a combination water and air pump is provided.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined by the appended claims.

Having thus described my invention, what I claim as new, and desire to secure by Letters-Patent, is,—

A pump comprising a cylinder having oppositely disposed valve-controlled inlet and exhaust ports opening horizontally thereinto at points adjacent its ends, main inlet and discharge pipes, branch pipes connecting said main pipes respectively with the inlet and exhaust ports, exhaust valves arranged in the branch exhaust pipes vertically disposed branch relief pipes communicating with the cylinder at points near its ends and on a vertical line centrally between the inlet and exhaust ports, a main relief pipe connecting the branch pipes, pressure operative relief valves reversibly arranged in the latter, a manually operable cut off valve removably applied to the end of the main relief pipe for controlling the opening and closing of the latter, a check valve disposed in the discharge pipe between the exhaust valves and a piston for reciprocation in the cylinder.

In testimony whereof I have hereunto set my hand in presence of two subscribing witnesses.

JOHN A. ELLIOTT.

Witnesses:
C. M. PARR,
G. J. LANGFORD.